United States Patent Office 3,377,198
Patented Apr. 9, 1968

3,377,198
OIL AND WATER REPELLENT SURFACES CONTAINING FLUORINATED METAL CHELATES
Manfred Sander, Frankfurt am Main, Germany, assignor to Chemische Fabrik Pfersee G.m.b.H., Augsburg, Germany, a firm of Germany
No Drawing. Original application Aug. 28, 1962, Ser. No. 220,071, now Patent No. 3,299,109, dated Jan. 17, 1967. Divided and this application July 7, 1966, Ser. No. 627,271
1 Claim. (Cl. 117—121)

ABSTRACT OF THE DISCLOSURE

Normally solid surfaces rendered oil and water repellent by a perfluorocarboxylic acid metal salt and a beta-dicarbonyl chelate forming compound, the metal being aluminium, titanium or zirconium.

---

This application is a division of U.S. patent application Ser. No. 220,071, filed Aug. 28, 1962, now U.S. Pat. No. 3,299,109.

This invention relates to novel chelate compounds of aluminium, titanium or zirconium salts of perfluorocarboxylic acids which are suitable as proofing agents for textiles, paper or leather to which they impart water-repellent and oil-repellent properties.

The preparation of these compounds is carried out according to the invention by reaction of alkoxides of aluminium, titanium or zirconium (a) with a chelate forming agent, especially beta-dicarbonyl compounds, such as acetoacetic acid ethyl ester or acetylacetone, and further (b) with a perfluoroaliphatic carboxylic acid, preferably a perfluoroalkylcarboxylic acid having more than 5 carbon atoms, e.g. perfluorocaproic acid, perfluorocaprylic acid and perfluorocapric acid.

According to the proportion of the components used, products of different constitution and properties are obtained. For instance, by reaction of 1 mol of aluminium ethoxide with 1 mol of acetyl-acetone and 2 mols of a perfluoroalkylcarboxylic acid compounds relating to Formula I

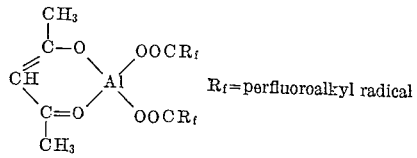

$R_f$ = perfluoroalkyl radical or by reaction of 1 mol of zirconiumisopropoxide with 2 mols of acetyl-acetone and 2 mols of a perfluoroalkylcarboxylic acid compounds relating to Formula II

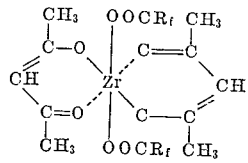

are obtained.

The reaction in both steps (a) and (b) is readily effected by mixing together the compounds at room temperature. This may be done either without any dilution with solvents or in the presence of inert organic solvents, such as aromatic hydrocarbons or ethers or ketones. If the components are reacted without any solvent it is advisable to use higher temperatures in order to get a better homogeneity. In this case, temperatures up to 200° C. may be used. It is also possible to add the components of steps (a) and (b) at the same time to the metal alkoxide or to the solutions of this alkoxide in inert organic solvents. However, better products are obtained by a two-step reaction as first mentioned. The addition of the component (b) first and the component (a) afterwards gives products with considerably diminished oil- and water-repellent properties.

If smaller mol quantities of the chelating agent and the perfluorocarboxylic acid than correspond to the valency of the metal are used, products are obtained which possess alkoxide residues on the metal atom. These compounds react upon heating to temperatures of about 150–250° C. by splitting off ethers or perfluoroalkylcarboxylic acid esters. By heating these alkoxide containing compounds with small quantities of water at temperatures of about 50–100° C., alcohol is split off and compounds with metal-oxygen-metal structure are obtained as illustrated in Formulas III and IV.

Formula III $$Al(OR)_3 + CH_3COCH_2COCH_3 + R_fCOOH \longrightarrow$$

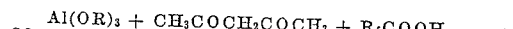

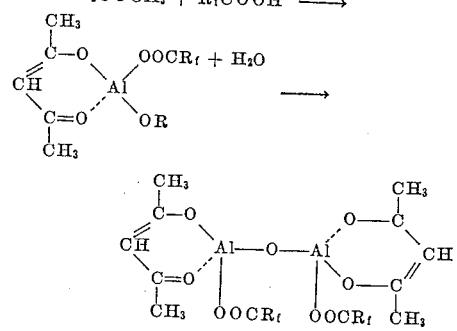

or

Formula IV $$Ti(OR)_4 + CH_3COCH_2COCH_3 + 2R_fCOOH \longrightarrow$$

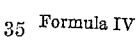

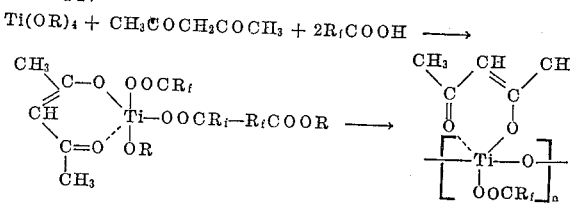

All the above stated formulae are only to be considered as characterizing the reactions mentioned and the components obtainable. In practice, mol proportions expressed in fractions are often used and thus mixtures of different compounds are obtained. Also, if mol proportions expressed in whole numbers are used, normally not a pure product of the expected formula is obtained, as side reactions such as hydrolysis, condensation or the formation of small amounts of perfluoroalkylcarboxylic acid ester, may always occur to a certain extent. This fact, however, is not important to the properties and the suitability of these products. Therefore, the starting materials need not have a high degree of purity.

The properties of the products mainly depend on their structure, i.e. on the mol proportion of the components used. For instance, all products with a high amount of metal-oxygen-metal valency are solid and often brittle, in organic solvents, insoluble or sparingly soluble. Products with a high amount of alkoxide groups of lower alcohols (less than 4 carbon atoms) are also solid and sparingly soluble in organic solvents. With increasing substitution of the valencies of the metal by perfluoroalkylcarboxylate groups or chelate groups, the products become softer and elastic or liquid. The solubility in organic solvents generally depends on the amount of chelate groups. Viscous or pasty products possess good film-forming properties and adhere excellently to all solid surfaces. The oil-repellency is generally diminished by a high amount of chelate groups.

The resistance to hydrolysis is also dependent on the amount of chelate groups. Products having more than 0.25 chelate groups per metal atom may be heated at the boiling point with water for longer periods without hydrolysis of the perfluoroalkylcarboxylate groups and change of the pH value of the aqueous dispersions of the products which are initially neutral. Only by longer heating at the boiling point of the products with mineral acids or alkali hydroxides will hydrolysis occur. The thermal stability of the products is limited by the decomposition temperature of the chelate forming agent. Therefore, complexes containing acetic acid ethyl ester start to decompose at about 180° C., while complexes containing acetyl-aceton are still stable at about 200° C.

The products according to the invention are not only useful for the impregnation of paper or leather or textiles, but also for surface treatment of glass, metals, wood or plastic materials. According to the desired use the characteristics such as solubility, dispersing properties, viscosity, oil-repellency, resistance to hydrolysis may be modified as mentioned above.

Example I 16.2 g. (0.1 mol) of aluminium ethoxide and 10 g. (0.1 mol) of acetyl acetone were heated with stirring to a temperature of 150° C. After 4.6 g. of ethanol had been distilled off, the reaction mixture was cooled to room temperature and 82.9 g. (0.2 mol) of perfluorocaprylic acid were added. By heating to about 180° C. a further quantity of 9.0 g. of ethanol was split off. 52.5 g. of a yellowish viscous paste containing 3.2% of aluminium were obtained. The product is soluble in diethyl ether, acetone, ethanol, tetrahydrofuran, benzene and toluene. When heating a trial lot of this product with water, no change could be observed within 10 minutes, the pH-value of the water was 6.0, the content of aluminium and the solubility of the heated trial lot were the same. The product obtained may be used as solution in organic solvents for the oil- and water-repellent finishing of textiles, paper or leather.

Example II

Instead of the aluminium ethoxide used in Example I 0.1 mol of aluminum isopropoxide or 0.1 mol of aluminium-tertiary-butoxide was used. As to their appearance, solubility, oil- and water-repellent efficiency, the products correspond to those obtained by application of aluminium ethoxide.

Example III 16.2 g. (0.1 mol) of aluminium ethoxide and 13 g. (0.1 mol) of acetoacetic acid ethyl ester were reacted at 120–150° C. After the splitting off of 4.5 g. of ethanol, 41.4 g. (0.1 mol) of perfluorocaprylic acid were added and the mixture was heated at 160–180° C., whereby 4.9 g. of ethanol were distilled off. The product obtained, a yellowish viscous substance, was soluble in ethanol, ether, acetone and tetrahydrofuran and contained 5.3% of aluminium.

Example IV

Aluminium ethoxide was reacted according to Example I with acetyl-acetone and further with different perfluoroalkylcarboxylic acids in a mol proportion of 1:1:1.

Example V 8.1 g. (0.05 mol) of aluminium ethoxide were dissolved in 50 ml. of toluene and 5 g. (0.05 mol) of acetyl-acetone were added to this solution. By this addition, the solution was heated at 40° C. After decrease of the reaction, 20.7 g. (0.05 mol) of perfluorocaprylic acid were added and the temperature rose slightly again. The solvent was distilled off under a vacuum at 80° C. bath temperature. A yellowish paste resulted which was soluble in ethanol, ether, acetone, benzene and tetrahydrofuran and contained 4.37% of aluminium, according to the analysis. When heated with water, a crumbly substance, which contained 5.12% of aluminium, was obtained.

Example VI

As described in Example I, zirconium butoxide was reacted with different quantities of acetyl-acetone and of perfluorocaprylic acid without the use of a solvent. All products were viscous or pasty and soluble in polar solvents, such as tetrahydrofuran. The results of the analysis are shown in the following table:

| Mol $CH_3COCH_2COCH_3$[1] | Mol $C_7F_{15}COOH$[1] | Product content of zirconium in percent |
|---|---|---|
| 0.5 | 2.5 | 13.5 |
| 0.5 | 3.5 | 11.0 |
| 1 | 2 | 15.2 |
| 1 | 3 | 12.7 |
| 2 | 2 | 12.8 |

[1] Per mol of $Zr(OC_4H_9)_4$.

Example VII 19.2 g. (0.05 mol) of zirconium butoxide were dissolved in 50 ml. of toluene and progressively reacted with 5 g. (0.05 mol) of acetyl-acetone and 20.7 g. (0.05 mol) of perfluorocaprylic acid at 20–50° C.

The product obtained by evaporation is an oil, which is soluble in most of the organic solvents and which contains 15.7% of zirconium. 2 g. of this substance were heated with 2 ml. of water for 10 minutes, whereby 1.6 g. of a yellowish powder were obtained which contained 20.2% of zirconium and which was insoluble in organic solvents.

Example VIII

According to Example I or VI titanium butoxide was reacted with different quantities of acetyl-acetone and of perfluorocaprylic acid. The products with a titanium content of less than 8% are oily; those with more than 8% are solid brittle substances. The results of the test are shown in the following table:

| Mol $CH_3COCH_2COCH_3$[1] | Mol $C_7F_{15}COOH$[1] | Product Content of Titanium in Percent |
|---|---|---|
| 0.5 | 3.5 | 6.9 |
| 1 | 2 | 12.1 |
| 1 | 3 | 9.4 |
| 2 | 2 | 4.6 |

[1] Per mol of $Ti(OC_4H_9)_4$.

Example IX 17.0 g. (0.05 mol) of titanium butoxide were progressively reacted in 50 ml. of toluene with 5 g. (0.05 mol) of acetyl-acetone and 20.7 g. (0.05 mol) of perfluorocaprylic acid. After distillation of the solvent, an oil was obtained which was slightly soluble in most of the solvents and contained 7.8% of titanium. When heated with water, an insoluble brittle product was obtained.

It is therefore claimed:
1. A surface having oil and water repellent properties due to the presence thereon of a perfluorocarboxylic acid metal salt and a beta-dicarbonyl chelate forming compound, said metal being aluminium, titanium or zirconium.

References Cited

UNITED STATES PATENTS 2,567,011  9/1951  Diesslin et al. _____ 260—465.7
2,803,615  8/1957  Ahlbrecht et al. _____ 260—29.6

MURRAY KATZ, Primary Examiner.

WILLIAM D. MARTIN, Examiner.

T. G. DAVIS, Assistant Examiner.

UNITED STATES PATENT OFFICE
CERTIFICATE OF CORRECTION

Patent No. 3,377,198                                          April 9, 1968

Manfred Sander

It is hereby certified that error appears in the above numbered patent requiring correction and that the said Letters Patent should read as corrected below.

Column 1, formula II should appear as shown below:

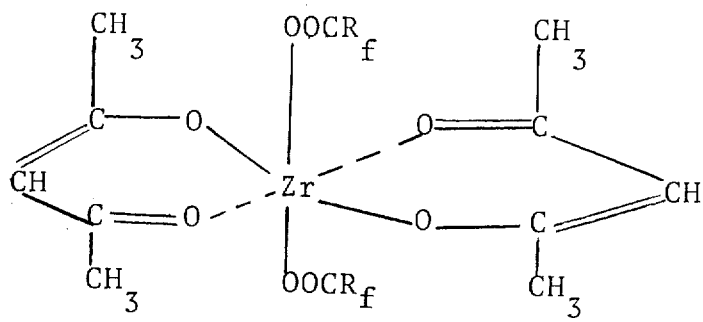

Column 2, that portion of formula IV reading

+ 2R COOH          should read       + $2R_f$COOH the last portion of formula IV should appear as shown below:

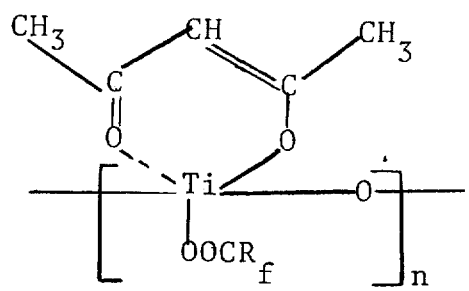

Signed and sealed this 11th day of November 1969.

(SEAL)
Attest:

EDWARD M. FLETCHER, JR.                         WILLIAM E. SCHUYLER, JR.
Attesting Officer                                        Commissioner of Patents